United States Patent [19]
Choi

[11] Patent Number: 6,040,820
[45] Date of Patent: Mar. 21, 2000

[54] TRACK BALL INPUT DEVICE

[75] Inventor: Dong Joon Choi, Daejeon, Rep. of Korea

[73] Assignee: LG Electronics Inc., Seoul, Rep. of Korea

[21] Appl. No.: 08/927,273

[22] Filed: Sep. 11, 1997

[30] Foreign Application Priority Data

Sep. 12, 1996 [KR] Rep. of Korea ......................... 96-29058

[51] Int. Cl.⁷ ........................................................ G09G 5/00
[52] U.S. Cl. .............................. 345/156; 345/163; 345/167
[58] Field of Search .................................... 345/157, 163, 345/167, 155–161

[56] References Cited

U.S. PATENT DOCUMENTS

| | | | |
|---|---|---|---|
| 4,562,347 | 12/1985 | Hovey et al. | 250/221 |
| 4,786,892 | 11/1988 | Kubo et al. | 340/365 |
| 5,063,289 | 11/1991 | Jasinski et al. | 250/221 |
| 5,281,958 | 1/1994 | Ashmun et al. | 345/157 |
| 5,428,368 | 6/1995 | Grant | 345/163 |
| 5,473,344 | 12/1995 | Bacon et al. | 345/163 |
| 5,504,500 | 4/1996 | Garthwaite et al. | 345/157 |
| 5,726,684 | 3/1998 | Blankenship et al. | 345/167 |

*Primary Examiner*—Richard A. Hjerpe
*Assistant Examiner*—Henry N. Tran
*Attorney, Agent, or Firm*—Finnegan, Henderson, Farabow, Garrett & Dunner, L.L.P.

[57] ABSTRACT

An input device used as a track ball mouse and a ball mouse comprising a first housing including a ball and a first button; a second housing connected to the first housing and including a second button; a connecting unit for connecting the first and second housings; and a controlling unit for sensing a rotating direction of the ball and controlling a pointer on a screen based on the rotating direction of the ball.

8 Claims, 4 Drawing Sheets

TRACK BALL INPUT DEVICE

BACKGROUND OF THE INVENTION

A. Field of the Invention

The present invention relates to an input device, and more particularly to a track ball input device which can be used as a ball mouse.

B. Description of the Prior Art

As an input device of a computer, the mouse has been used instead of a key board. This ball mouse is more useful for the window operating system of the personal computer. There are two types of mouse, i.e., a ball mouse and a track ball mouse. The ball mouse is used for a desktop computer on the flat plate such as a desk and the track ball mouse is used for a portable computer such as a notebook computer.

FIGS. 1 and 2 are views indicating a conventional track ball input device and the track ball input device-mounted notebook computer. As shown in FIG.1, the conventional track ball input device is mounted in the notebook computer. This track ball input device comprises track ball 3 to be rotated by a finger to move the pointer to the desired characters and figures, a button 4 for selecting one of these characters and figures, a transmitting unit 5 in which the infrared transmitting window for wireless communication between the computer and the track ball input device is mounted, and a connector 6 for communication between the computer and the track ball input device mounted in the computer.

The above track ball input device 1 is connected to the portable computer, i.e., notebook computer, in a wireless manner using an infrared communication device (not shown in figure).

Although the track ball input device is generally mounted in the portable computer for convenience, it is more inconvenient than the ball mouse when the user works on the flat plate such as the desk. Further, since the track ball is rotated by the finger, it is difficult to finely operate the track ball.

SUMMARY OF THE INVENTION

It is an object of the present invention to overcome the above problems and disadvantages of the prior art system.

In order to achieve this object, according to the embodiment of the present invention, an input device, as broadly defined and embodied herein, comprises a first housing including a ball and a first button; a second housing connected to the first housing, and including a second button; a connecting unit for connecting the first and second housings; and a controlling unit for sensing a rotating direction of the ball and controlling a pointer on a screen based on the rotating direction of the ball.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings. Wherever possible, the same reference numbers will be used throughout the drawings to refer to the same or like parts.

Figure 1:
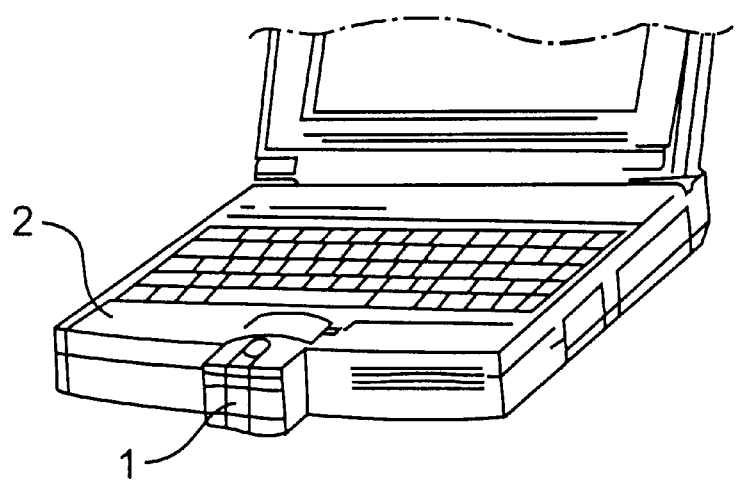
FIG. 1 is a prospective view of the conventional notebook computer.
Figure 2:
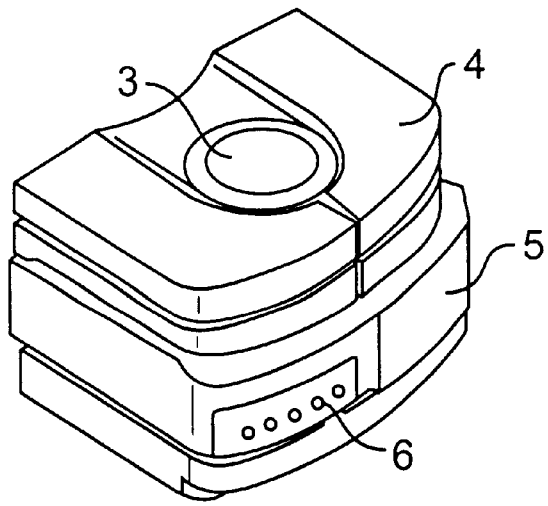
FIG. 2 is a view showing the conventional track ball mouse.
Figure 3:
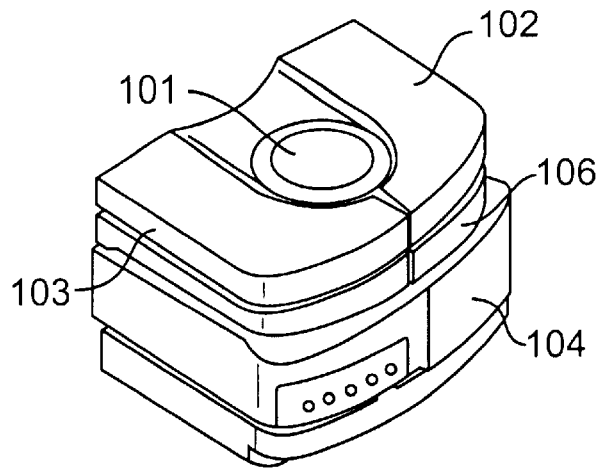
FIG. 3 is a view showing a track ball input device according to a first embodiment of the present invention.
Figure 4:
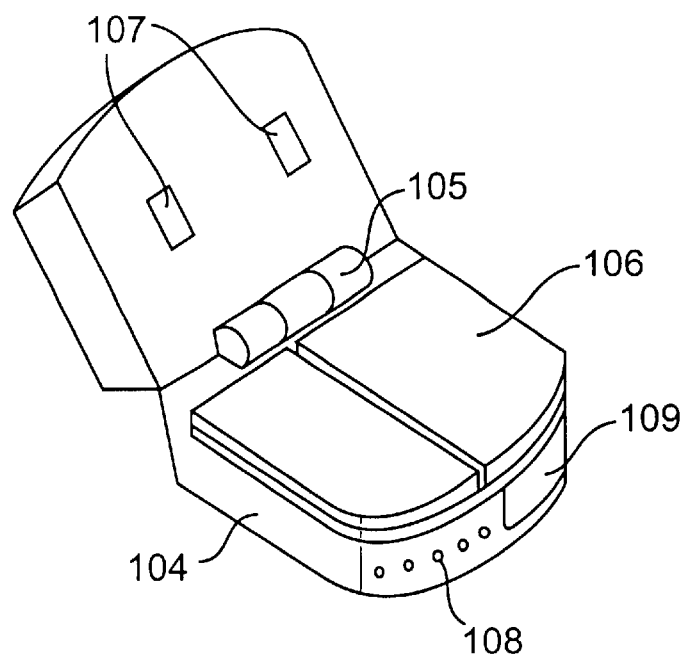
FIG. 4 is a view showing a connection of the track ball housing and the base housing of the track ball input device according to the first embodiment of the present invention.

Referring to FIGS. 3 and 4, the track ball input device according to the first embodiment of the present invention comprises a track ball housing 103 including ball to be rotated by the finger to move the pointer to the characters or figures on the screen, and track ball button 106 for selecting the desired characters or figures, a base housing 104 including the button 106, the base housing 104 being connected to the one side of the track ball housing 103, a hinge 105 rotatably connecting the track ball housing 103 and the base housing 104, a pointing button 107 which pushes the button 106 of the base housing 104 for clicking the track ball button 102. In the figures, the reference numbers 108 and 109 indicate a connector and a infrared transmitting unit when the track ball input device is mounted to the computer and separate from the computer, respectively.

Hereinafter, the operation of the track ball input device will be described in detail.

When the track ball input device is used as track ball mouse, that is, the track ball input device is mounted in the computer, the ball 101 is rotated by the finger to move the pointer to the desired characters or figures on the screen and then the track ball button 102 is clicked to selected one of the characters or figures. When the track ball button 102 is clicked, the pointing button 107 also clicks the button 106 of the base housing 104.

Figure 5:
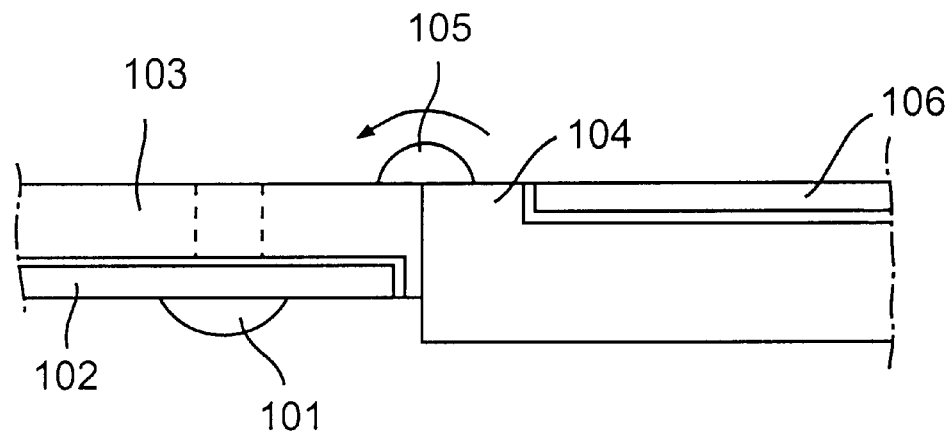
FIG. 5 is a view showing the operation of the track ball input device according to the first embodiment of the present invention.

When the track ball input device which is separated from the computer is used as ball mouse on the desk, etc., the track ball housing 103 is rotated centering around the hinge 105, so that the ball 101 contacts to the plate of the desk, as shown in FIG. 5. At that time, the user grasps the base housing 104 and moves the track ball input device to move the pointer to the desired characters or figures, then pushes the button 106 of the base housing 104.

Figure 6:
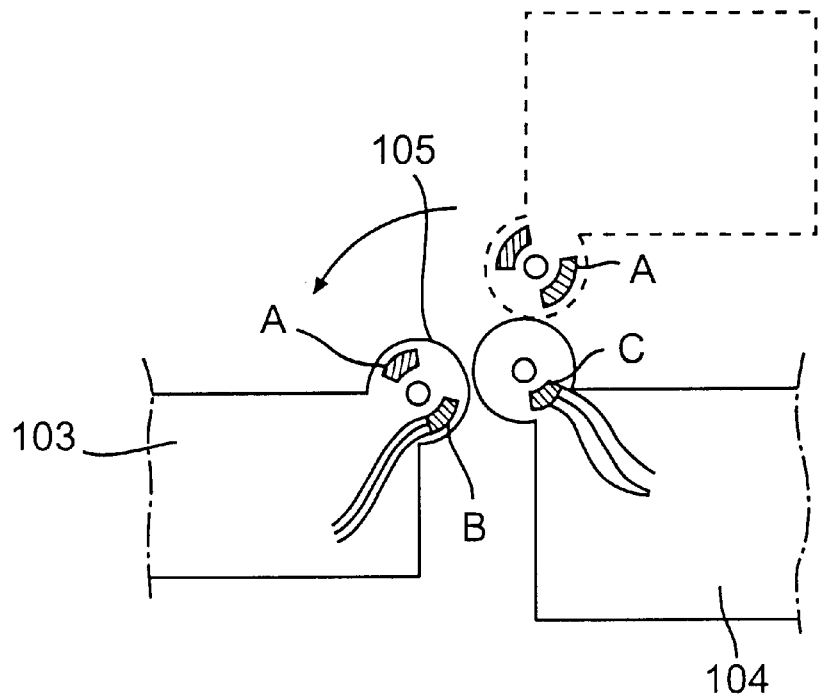
FIG. 6 is a view showing the hinge of the track ball input device according to the first embodiment of the present invention.

In the hinge, as shown in FIG. 6, the first, second, and third contact units A,B,C for contacting electrically the track ball housing 103 and the base housing 104 are formed. When the track ball input device is used as track ball mouse and ball mouse, the left and right directions of the pointer is dependent upon the rotating direction of the track ball housing 103, while the up and down directions are independent from the rotating direction. To solve this rotating dependence problem, the first and second contacting units A,B are formed in the track ball housing 103, as shown in FIG. 6. When the track ball housing 103 is used as the track ball mouse, i.e., the track ball housing 103 and the base housing 104 are folded, the third contacting unit C of the base housing 104 contacts the first contact unit A of the track ball housing A. When the track ball housing 103 is used as the ball mouse, the third contacting unit C contacts the second contacting unit B. By this different contact of contacting units A,B,C for track ball mouse and ball mouse, therefore, the direction of the pointer is uniformly retained.

Figure 7:
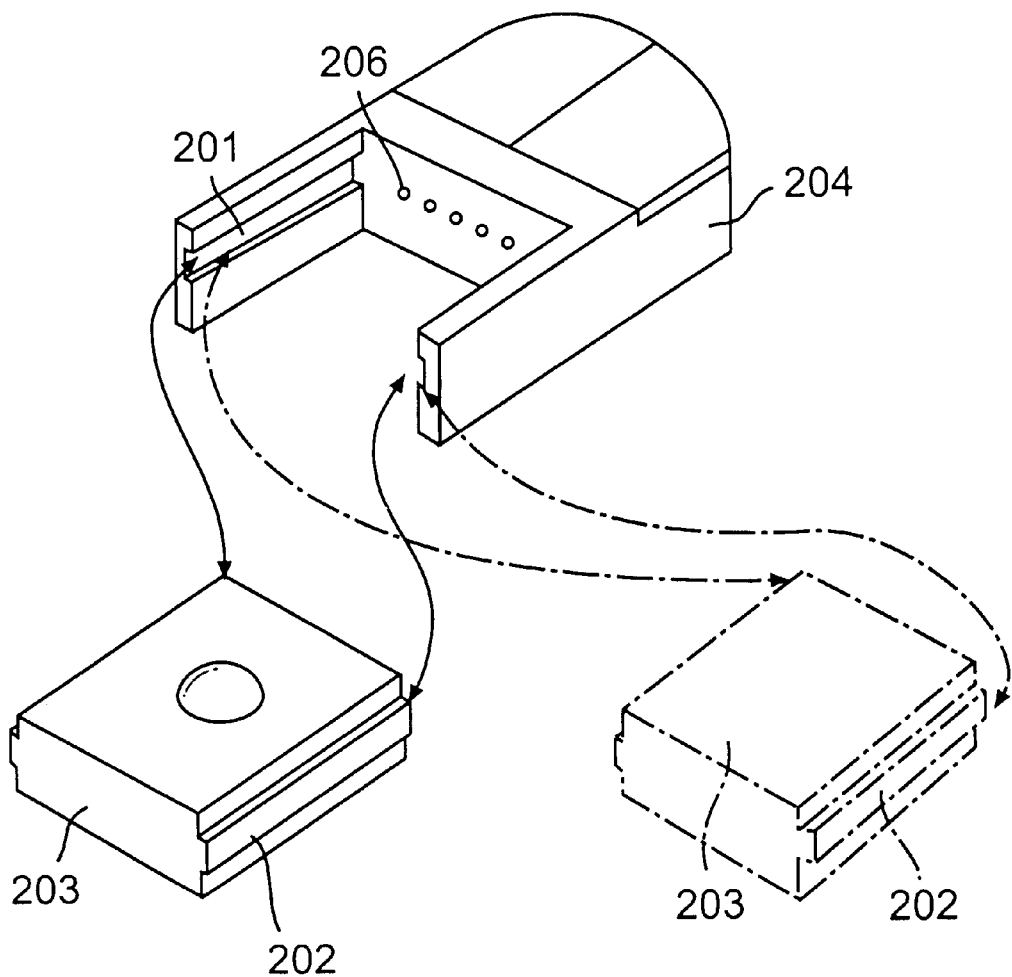
FIG. 7 is a view showing a track ball input device according to a second embodiment of the present invention.

FIG. 7 is a view showing the second embodiment of the present invention. As shown in the figure, the track ball housing 203 is separated from the base housing 204. When the track ball input device is used as the ball mouse, the track ball housing 203 is separated from the base housing 204 and turned to insert the projections 202 of the track ball housing 203 into the guide groves 201 of the base housing 204 again.

At that time, since the track ball housing 203 is turned, the up and down directions of the pointer according to the rotating direction of the track ball is varied. However, since the connecting direction of the connector 206 of the base housing 204 is also varied, the direction of the pointer is controlled by setting the computer. Although only the connector 206 of the base housing 204 is shown in the figure, the other connector is also formed in the track ball housing 203 to connect the connectors of the track ball housing 203 and the base housing 204.

As shown in above, the track ball input device of the present invention can be used as the track ball mouse and the ball mouse, and the user can use it conveniently.

While the preferred form of the present invention has been described, it is to be understood that modifications will be apparent to those skilled in the art without departing from the spirit of the invention.

The scope of the invention, therefore, is to be determined solely by the following claims.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An input device used as a track ball mouse and a ball mouse, comprising:

a first housing including a ball and a track ball button;

a second housing, including a ball mouse button, the first housing hinged to the second housing to be selectively usable in a track ball position and a ball mouse position, said track ball position including a position where the first and second housings are folded upon one another, said ball mouse position including a position where the first and second housings are unfolded; and a controlling unit sensing a rotating direction of the ball and controlling a movement of a pointer on a screen based on the rotating direction of the ball.

2. The input device according to claim 1, wherein the first housing includes a connecting button between the track ball and the ball mouse button in the track ball position and automatically clicking the ball mouse button when the track ball button is clicked in the track ball position.

3. The input device according to claim 1, further comprising means for determining whether the device is in the track ball position or the ball mouse position.

4. The input device according to claim 3, wherein the means for determining comprises:

first and second contacting units on the first housing; and a third contacting unit on the second housing, wherein the first and third contacting units are electrically coupled in the track ball position, and the second and third contacting units are electrically coupled in the ball mouse position.

5. The input device according to claim 1, wherein said controlling unit includes a device controlling the movement of the pointer in the track ball position differently than the movement of the pointer in the ball mouse position.

6. An input device used as a track ball mouse and a ball mouse, comprising:

a first housing having a top surface and a bottom surface;

a button on the top surface of the first housing;

a second housing having a surface including a ball, the second housing removably coupled to the first housing to be selectively usable in a track ball position and a mouse ball position, the track ball position including a position in that the surface of the second housing and the top surface of the first housing face in a same direction, the ball mouse position including a position in that the surface of the second housing and the bottom surface of the first housing face in a same direction; and a controlling unit sensing a rotating direction of the ball and controlling a movement of a pointer on a screen based on the rotating direction of the ball.

7. The input device according to claim 6, wherein the second housing is coupled to the first housing by sliding a projection on a side surface of the second housing into a guide groove of the first housing.

8. The input device according to claim 6, wherein said controlling unit includes a device controlling the movement of the pointer in the track ball position differently than the movement of the pointer in the ball mouse position.

* * * * *